United States Patent
Hollweck

(10) Patent No.: US 10,145,296 B2
(45) Date of Patent: Dec. 4, 2018

(54) EXHAUST-GAS TURBOCHARGER FOR A MOTOR VEHICLE

(71) Applicant: MAN Truck & Bus AG, München (DE)

(72) Inventor: Johannes Hollweck, Sulzbach-Rosenberg (DE)

(73) Assignee: MAN TRUCK & BUS AG, Munich (DE)

( * ) Notice: Subject to any disclaimer, the term of this patent is extended or adjusted under 35 U.S.C. 154(b) by 68 days.

(21) Appl. No.: 15/374,346

(22) Filed: Dec. 9, 2016

(65) Prior Publication Data
US 2017/0167363 A1 Jun. 15, 2017

(30) Foreign Application Priority Data
Dec. 11, 2015 (DE) .................. 10 2015 016 030

(51) Int. Cl.
*F02B 29/04* (2006.01)
*F02C 6/12* (2006.01)
(Continued)

(52) U.S. Cl.
CPC .......... *F02B 29/0468* (2013.01); *F01D 25/32* (2013.01); *F02B 29/0406* (2013.01); *F02B 33/40* (2013.01); *F02B 37/00* (2013.01); *F02C 6/12* (2013.01); *F02M 25/028* (2013.01); *F02M 25/0222* (2013.01); *F02M 35/088* (2013.01);
(Continued)

(58) Field of Classification Search
CPC ...... F02B 29/0468; F02B 37/00; F02B 33/40; F02B 29/0406; F01D 25/32; F02C 6/12; Y02T 10/144; Y02T 10/146; Y02T 10/121; F02M 35/10157; F02M 25/028; F02M 35/10131; F02M 25/0222;
(Continued)

(56) References Cited

U.S. PATENT DOCUMENTS

2008/0226445 A1 9/2008 Pommier et al.
2009/0205326 A1 8/2009 Watson
(Continued)

FOREIGN PATENT DOCUMENTS

DE 10238839 A1 3/2004
DE 102008045685 A1 9/2010
(Continued)

OTHER PUBLICATIONS

European Search report issued in corresponding application No. 16002403.0 dated Jan. 2, 2017.

*Primary Examiner* — Hoang Nguyen
(74) *Attorney, Agent, or Firm* — Carter, Deluca, Farrell & Schmidt, LLP

(57) ABSTRACT

The present disclosure relates to an exhaust-gas turbocharger for a supercharged internal combustion engine having a charge-air cooler. In order to prevent the formation in the charge-air-guiding parts of condensate which above a certain quantity, if it remains within the charge-air-guiding parts, leads to damage to the engine, such as, for example, ice formation, water shock or corrosion, it is proposed to provide a condensate outlet opening on the compressor of the exhaust-gas turbocharger, which opening is provided in a lowermost region of a charge-air flow path through the compressor.

13 Claims, 2 Drawing Sheets

(51) Int. Cl.
  *F02M 35/10* (2006.01)
  *F01D 25/32* (2006.01)
  *F02B 33/40* (2006.01)
  *F02B 37/00* (2006.01)
  *F02M 35/08* (2006.01)
  *F02M 25/028* (2006.01)
  *F02M 25/022* (2006.01)

(52) U.S. Cl.
  CPC ........... *F02M 35/10104* (2013.01); *F02M 35/10131* (2013.01); *F02M 35/10157* (2013.01); *F05D 2220/40* (2013.01); *F05D 2260/602* (2013.01); *F05D 2260/608* (2013.01); *Y02T 10/121* (2013.01); *Y02T 10/144* (2013.01); *Y02T 10/146* (2013.01)

(58) Field of Classification Search
  CPC ............ F02M 35/10104; F02M 35/088; F05D 2220/40; F05D 2260/608
  USPC ............. 60/600, 605.1, 605.2, 605.3, 611
  See application file for complete search history.

(56) References Cited

U.S. PATENT DOCUMENTS

| | | | |
|---|---|---|---|
| 2012/0174576 A1 | 7/2012 | Vigild et al. | |
| 2013/0291536 A1* | 11/2013 | Koch | F02B 29/0468 60/599 |
| 2014/0208740 A1 | 7/2014 | Malone et al. | |
| 2014/0290630 A1* | 10/2014 | Pursifull | F02B 29/0468 123/564 |
| 2015/0198119 A1* | 7/2015 | Kuske | F02M 25/0709 60/605.2 |

FOREIGN PATENT DOCUMENTS

| | | |
|---|---|---|
| DE | 102011108458 A1 | 1/2013 |
| WO | 03/001039 A1 | 1/2003 |
| WO | 2006/045488 A1 | 5/2006 |
| WO | 2014/207831 A1 | 12/2014 |
| WO | 2015/098550 A1 | 7/2015 |

\* cited by examiner

EXHAUST-GAS TURBOCHARGER FOR A MOTOR VEHICLE

BACKGROUND

The present disclosure relates to an exhaust-gas turbocharger for a motor vehicle having a supercharged internal combustion engine and a charge-air cooler.

In order to achieve an increase in performance of a combustion engine, the air to be fed for combustion can be compressed, for example, with a turbocharger before it is fed to the combustion chambers of the combustion engine. However, the compression of the air is simultaneously accompanied by a heating thereof which is disadvantageous for the combustion process to proceed optimally. Consequently, for example, premature ignition or increased nitrogen oxide emission can be triggered. In order to avoid the disadvantageous consequences of the combustion of fed-in superheated air, it is known for a heat exchanger designed as a charge-air cooler to be arranged downstream of a turbocharger, by means of which heat exchanger the compressed air can be cooled to a permissible temperature before its combustion.

In the case of such charge-air-cooled engines, condensate, for example condensed water, forms under certain circumstances, for example particularly at low load or low outside temperatures. Above a certain quantity, if it remains within the charge-air-guiding parts, such condensate can lead to damage to the engine, such as, for example, through ice formation, water shock or corrosion. This condensate must therefore be removed without any damage. The prior art discloses approaches for this which allow the condensate to be discharged from the charge-air cooler. Such an approach is disclosed for example in German laid-open specification DE 102 38 839 A1. A disadvantage of this approach is that, in the case of an engine design in which the charge-air guiding means is configured to fall continuously between the charge-air cooler and turbocharger, condensate accumulation can nevertheless occur outside the charge-air cooler.

SUMMARY

It is thus an object of the present disclosure to provide an improved possibility to allow condensate discharge in a charge-air cooled engine, by means of which disadvantages of conventional techniques can be avoided. The object on which the present disclosure is based is in particular simple, cost-saving and reliable condensate discharge in an engine design in which the charge-air guiding means is configured to fall continuously from the charge-air cooler to the turbocharger compressor or to rise continuously from the turbocharger compressor to the charge-air cooler.

Advantageous embodiments and applications of the present disclosure are illustrated in more detail in the following description with partial reference to the figures.

According to general aspects of the present disclosure an exhaust-gas turbocharger for a motor vehicle, in particular for a commercial vehicle, is provided, wherein a compressor of the exhaust-gas turbocharger has an opening for letting out a condensate, which opening is arranged in a lowermost region of a charge-air flow path of the compressor. The opening is referred herein below as a condensate outlet opening. The lowermost region of the charge-air flow path of the compressor corresponds to the geodetically lowest point of the flow path. The lowermost region or the geodetically lowest point refers to the orientation of the exhaust-gas turbocharger which is assumed thereby when it is in the mounted state on the vehicle. It is thus that point which is at the smallest distance from the roadway when the exhaust-gas turbocharger is in the mounted state.

The condensate outlet opening can be provided on a compressor housing of the exhaust-gas turbocharger, in particular at a lowermost point or geodetically lowest point of the compressor housing. The condensate outlet opening can be arranged for example at the geodetically lowest point of the pressure spiral of the compressor.

Such an exhaust-gas turbocharger is particularly advantageous for engine or vehicle designs whose charge-air guide means is configured to fall continuously between the charge-air cooler and turbocharger, i.e. the charge-air guide means starting from the charge-air outlet of the compressor to the charge-air inlet of the charge-air cooler is configured to rise continuously. In such a charge-air guide means, the condensate which occurs and which collects at the lowest point of the charge-air guide means can be discharged in a simple and reliable manner via the condensate outlet opening according to the present disclosure.

A diameter of this condensate outlet opening is preferably small by comparison with the diameter of the charge-air line in order to cause at least only a minor negative impact, if any, on the efficiency of the exhaust-gas turbocharger. It is particularly advantageous to configure the condensate outlet opening as a connection for a condensate discharge line. For this purpose, the condensate outlet opening can have a thread and/or be configured as a hose connector.

Apart from the condensate outlet opening according to the present disclosure the exhaust-gas turbocharger can otherwise be configured in a manner known per se. The exhaust-gas turbocharger can comprise an exhaust-gas turbine, the compressor and a drive shaft, the exhaust-gas turbine and the compressor being coupled in movement via the drive shaft.

According to a further aspect of the present disclosure a drive device for a motor vehicle, in particular for a commercial vehicle, is provided which comprises an exhaust-gas turbocharger as described in this document. The drive device further comprises an internal combustion engine supercharged by the exhaust-gas turbocharger, a charge-air cooler for cooling charge air compressed by the compressor of the exhaust-gas turbocharger, and a first charge-air guide means, for example in the form of a first charge-air line, which connects a charge-air outlet of the compressor to a charge-air inlet of the charge-air cooler. The first charge-air line can be configured to rise continuously starting from the charge-air outlet of the compressor to the charge-air inlet of the charge-air cooler. In other words, the charge air conveyed in the first charge-air line moves constantly upwards, i.e. against the force of gravity, with the result that the geodetically lowest point of the first charge-air line is the point of connection of this charge-air line to the compressor.

The drive device can comprise a line which is connected at one end to the condensate outlet opening and at the other end opens into a second charge-air line which feeds charge air cooled by the charge-air cooler to the internal combustion engine. This line is referred to herein below as a condensate discharge line. A particular advantage of this embodiment variant lies in the fact that discharged condensate is fed automatically to the internal combustion engine and concomitantly combusted there. It should be noted here that generally a higher gas pressure prevails in the compressor of the exhaust-gas turbocharger, in particular at the outlet of the pressure spiral of the compressor, than in the second charge-air line downstream of the charge-air cooler and before entry into the internal combustion engine. On account of this differential pressure, there is obtained a continuous flow within the condensate discharge line to the internal combustion engine, with the result that branched-off condensate generally does not run back again into the compressor but is reliably conveyed into the internal combustion engine.

Here, the condensate discharge line can open into the second charge-air line directly at a charge-air inlet of the internal combustion engine or directly upstream of the charge-air inlet.

According to a further embodiment, the condensate discharge line can have a reservoir for receiving condensate. The reservoir can be configured for example as a depression in the condensate discharge line or as a collecting container. This embodiment offers the advantage that a return of the branched-off condensate into the compressor is avoided even in certain operating states in which it cannot be ensured that the branched-off condensate is conveyed continuously by the condensate discharge line to the internal combustion engine.

According to a further embodiment, a return check valve can be arranged in the condensate discharge line and prevent a return flow into the compressor of condensate or air which has emerged from the condensate outlet opening. This variant, too, thus prevents an unwanted return flow of the branched-off condensate back into the compressor.

It is particularly advantageous if both a reservoir for receiving condensate and a return check valve are arranged in the condensate discharge line. Preferably, in this case, the reservoir is arranged between the condensate outlet opening and the return check valve.

A further possibility for realizing the present disclosure provides that the condensate discharge line is configured to be heatable. Consequently, freezing of the condensate discharge line is prevented, which would be conceivable for example at temperatures below 0° C. Blow-by lines or crankcase-venting lines which are heated are known for example from practice. In an analogous manner, according to the present disclosure the condensate discharge line can also be heated.

According to a further aspect, a motor vehicle is provided, having an exhaust-gas turbocharger as described in this document or having a drive device as described in this document. The motor vehicle may be a commercial vehicle.

The above-described embodiments and features of the present disclosure can be combined with one another as desired.

BRIEF DESCRIPTION OF THE DRAWINGS

Further details and advantages of the present disclosure are described herein below with reference to the appended drawings, in which.

Identical or functionally equivalent elements are designated with the same reference signs in all the figures.

DETAILED DESCRIPTION

Figure 1:
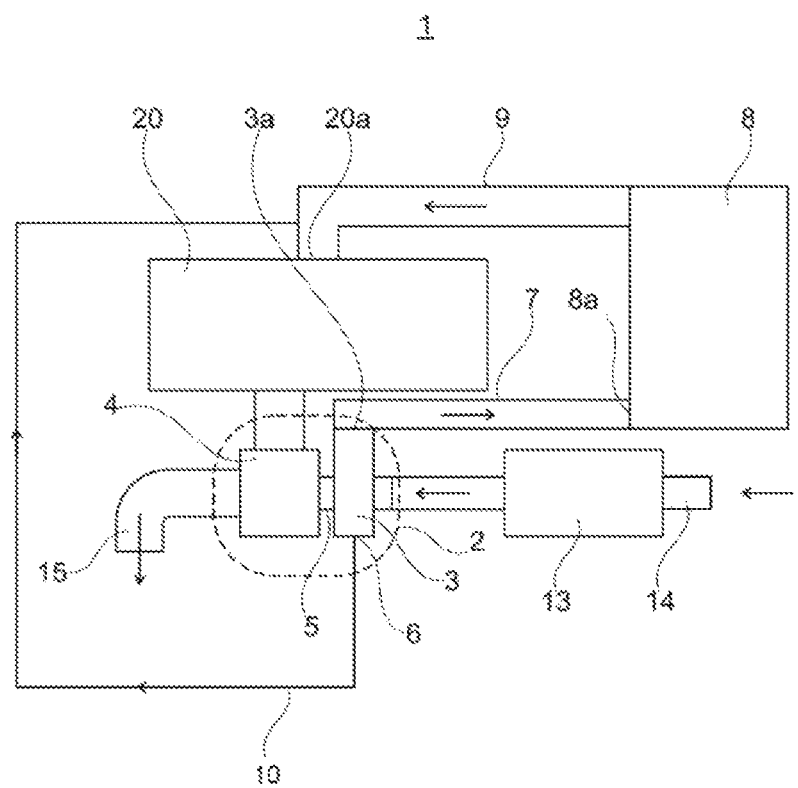
FIG. 1 shows a schematic illustration of a drive device according to one embodiment of the invention.

FIG. 1 shows a highly schematic illustration of a drive device 1 for a commercial vehicle. The drive device 1 comprises a combustion engine 20 which is supercharged with an exhaust-gas turbocharger 2 in order to increase performance.

The exhaust-gas turbocharger 2 comprises a rotor made up of a turbine 4, a compressor 3 and a drive shaft 5. The turbine 4 and the compressor 3 are coupled in movement via the drive shaft 5. The turbine 4 is driven by an exhaust gas of the combustion engine 20 that is fed to the turbine 4 via the exhaust-gas pipe 15. The compressor 3 is fed with fresh air via a feed line 14. The compressor 3 compresses the charge air to be fed to the combustion engine 20 and thus increases the performance of the combustion engine 20 during normal fired operation.

The charge air compressed by the compressor 3 is fed via a first charge-air line 7 to a charge-air cooler 8 which functions as a heat exchanger and cools the charge air. The cooled charge air is then fed via the second charge-air line 9 into the combustion engine 20. The first charge-air line 7 is configured to rise continuously starting from the charge-air outlet 3a of the compressor 3 to the charge-air inlet 8a of the charge-air cooler 8. This is not depicted in the schematic illustration of FIG. 1, but in the enlarged partial view of FIG. 2A.

Figure 2A:
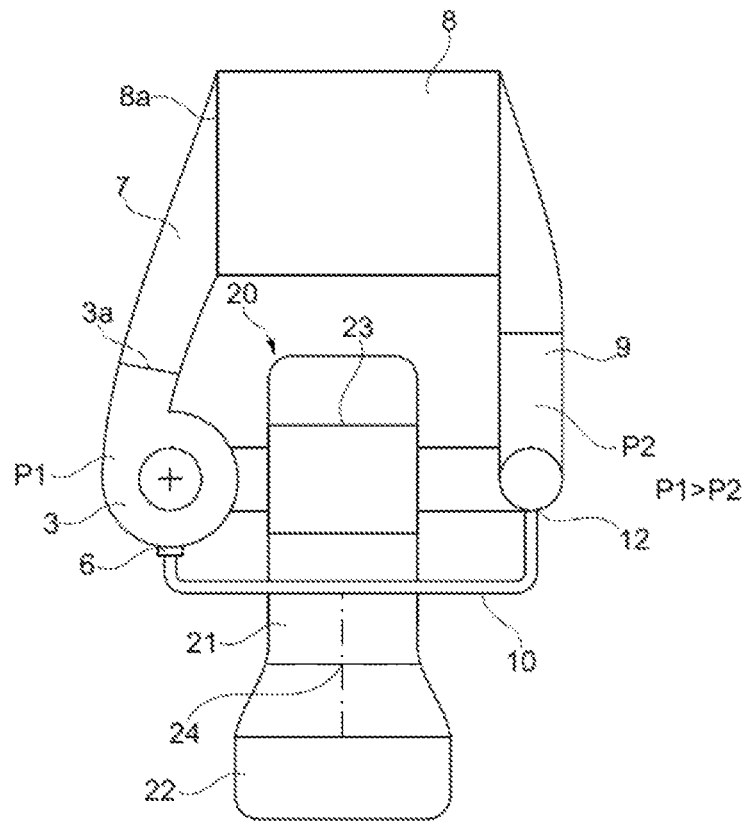
FIG. 2a shows an enlarged partial view of the embodiment.

FIG. 2A shows the combustion engine 20 in an end view. Reference sign 21 designates the crankcase of the combustion engine 20 and reference sign 24 designates the centre line of the crankshaft. An oil sump 22 is situated below the crank case 21. Situated in the upper region of the combustion engine 20 is the cylinder head region 23 at which the charge-air pipe line 9 opens into the combustion engine. The charge-air inlet of the combustion engine 20 is designated by reference sign 20a.

The compressor 3 of the exhaust-gas turbocharger 2 has an opening for letting out condensate (condensate outlet opening 6) in a lowermost region of a charge-air flow path of the compressor 3. The condensate outlet opening 6 is mounted on the geodetically lowest point of the compressor housing, in particular on the geodetically lowest point of the pressure spiral of the compressor 3. The condensate outlet opening 6 is configured as a connection for a line 10, designated herein below as a condensate discharge line 10. The connection can be embodied for example as a thread or as a hose connector.

The condensate discharge line 10 is thus connected at one end to the condensate outlet opening 6, and at its other end it opens into the second charge-air line 9 which connects the charge-air outlet of the charge-air cooler 8 to the charge-air inlet 20a of the combustion engine 20.

As is further illustrated in FIG. 2A, a higher pressure P1 prevails in the pressure spiral of the compressor 3 than in the second charge-air line 9, i.e. in the region downstream of the charge-air cooler 8 and before entry into the combustion engine 20. On account of the differential pressure P1-P2, there is obtained a continuous flow through the condensate discharge line 10 from the condensate outlet opening 6 to the connection 12 into the second charge-air line.

In this way, condensate discharged from the compressor 3 is conveyed continuously via the condensate discharge line 10 to the combustion engine 20 and combusted there. On account of the continuously falling profile of the first charge-air line 7 from the charge-air cooler to the compressor 3, condensate which occurs collets at the geodetically lowest point in the compressor 3 and can be reliably discharged there through the condensate outlet opening 6 provided.

Figure 2B:
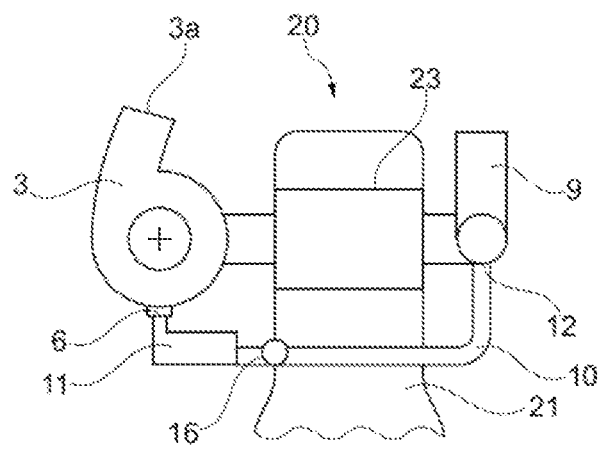
FIG. 2b shows an enlarged partial view of a further embodiment of the present disclosure.

FIG. 2B shows a further embodiment of the present disclosure. Here, components with identical reference signs correspond to the components of FIG. 1 and FIG. 2A and are not described separately.

A particular feature of the embodiment variant shown in FIG. 2B lies in the fact that a reservoir 11 for receiving and for collecting condensate is provided in the condensate discharge line 10 in the region of the condensate outlet opening 6. It has already been established above that in normal operating states the pressure P1 at the outlet of the pressure spiral of the compressor 3 is normally greater than the pressure P2 in the second charge-air line. Should, however, operating states occur where this is not the case, the reservoir 11 makes it possible to prevent a situation in which condensate already branched off from the compressor 3 via the condensate outlet opening 6 returns again into the compressor. Instead, the condensate would collect in the reservoir 11.

As an alternative or in addition, this can be ensured by a return check valve 16 which is provided in the condensate discharge line 10. The return check valve 16 can be provided for example directly at the region where the condensate discharge line 10 connects to the condensate outlet opening 6 or, as shown in FIG. 2B, directly downstream of the reservoir 11, the reservoir 11 being arranged between the condensate outlet opening 6 and the return check valve 16.

Even though the present disclosure has been described with reference to particular exemplary embodiments, it is self-evident to a person skilled in the art that various changes may be made and equivalents may be used as substitutes without departing from the scope of the present disclosure. In addition, many modifications may be made without departing from the associated scope. Consequently, the present disclosure is not intended to be restricted to the exemplary embodiments disclosed, but rather is intended to encompass all exemplary embodiments which fall within the scope of the appended patent claims. In particular, the present disclosure also claims protection for the subject matter and the features of the subclaims independently of the claims to which reference is made.

LIST OF REFERENCE SIGNS

1 Drive device
2 Exhaust-gas turbocharger
3 Compressor
3a Charge-air outlet of the compressor
4 Turbine
5 Drive shaft
6 Condensate outlet opening
7 Charge-air line
8 Charge-air cooler
8a Charge-air inlet of the charge-air cooler
9 Charge-air line
10 Condensate discharge line
11 Reservoir
12 Line connection
13 Air filter
14 Air feed
15 Exhaust-gas pipe
16 Return check valve
20 Internal combustion engine
20a Internal combustion engine charge-air inlet
21 Crankcase
22 Oil sump
23 Cylinder head region
24 Centre line of the crankshaft

The invention claimed is:

1. An exhaust-gas turbocharger for a motor vehicle comprising:
a compressor defining a charge-air flow path; and
a condensate outlet opening arranged in a lowermost region of a charge-air flow path,
wherein the condensate outlet opening is arranged at the geodetically lowest point of a pressure spiral of the compressor.

2. The exhaust-gas turbocharger according to claim 1, wherein the condensate outlet opening is provided on a lowermost point of a compressor housing.

3. The exhaust-gas turbocharger according to claim 1, wherein the condensate outlet opening a connection for a condensate discharge line.

4. A drive device for a motor vehicle, comprising:
an exhaust-gas turbocharger including a compressor defining a charge-air flow path and a condensate outlet opening arranged in a lowermost region of a charge-air flow path;
an internal combustion engine supercharged by the exhaust-gas turbocharger;
a charge-air cooler for cooling charge air compressed by the compressor of the exhaust-gas turbocharger; and
a first charge-air line which connects a charge-air outlet of the compressor to a charge-air inlet of the charge-air cooler.

5. The drive device according to claim 4, wherein the motor vehicle is a commercial vehicle.

6. The drive device according to claim 4, wherein the first charge-air line is configured to rise continuously starting from the charge-air outlet of the compressor to the charge-air inlet of the charge-air cooler.

7. The drive device according to claim 4, further comprising a condensate discharge line which is connected at one end to the condensate outlet opening and opens at the other end into a second charge-air line which feeds charge air cooled by the charge-air cooler to the internal combustion engine.

8. The drive device according to claim 7, wherein the condensate discharge line opens into the second charge-air line at a charge-air inlet of the internal combustion engine or directly upstream of the charge-air inlet.

9. The drive device according to claim 7, wherein the condensate discharge line has a reservoir for receiving condensate.

10. The drive device according to one of claim 7, further comprising a return check valve arranged in the condensate discharge line preventing return flow into the compressor of condensate or air which has emerged from the condensate outlet opening.

11. The drive device according to claim 10, wherein the reservoir is arranged between the condensate outlet opening and the return check valve.

12. The drive device according claim 7, wherein the condensate discharge line is configured to be heatable.

13. A motor vehicle, in particular a commercial vehicle, comprising:
an exhaust-gas turbocharger including a compressor defining a charge-air flow path and a condensate outlet opening arranged in a lowermost region of a charge-air flow path, wherein the condensate outlet opening is arranged at the geodetically lowest point of a pressure spiral of the compressor;
an internal combustion engine supercharged by the exhaust-gas turbocharger;
a charge-air cooler for cooling charge air compressed by the compressor of the exhaust-gas turbocharger; and
a first charge-air line which connects a charge-air outlet of the compressor to a charge-air inlet of the charge-air cooler.

* * * * *